US006802615B2

(12) United States Patent
Okada

(10) Patent No.: US 6,802,615 B2
(45) Date of Patent: Oct. 12, 2004

(54) PROJECTOR AND LAMP INFORMATION MANAGEMENT METHOD USED FOR THE SAME

(75) Inventor: Takayuki Okada, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 10/436,087

(22) Filed: May 13, 2003

(65) Prior Publication Data

US 2003/0214638 A1 Nov. 20, 2003

(30) Foreign Application Priority Data

May 16, 2002 (JP) ....................................... 2002-141401

(51) Int. Cl.[7] ............................................... G03B 21/20
(52) U.S. Cl. ......................................................... 353/85
(58) Field of Search ........................... 362/295; 353/85; 340/458

(56) References Cited

U.S. PATENT DOCUMENTS

| | | | | | |
|---|---|---|---|---|---|
| 5,969,485 | A | * | 10/1999 | Hunt | 315/292 |
| 6,208,087 | B1 | * | 3/2001 | Hughes et al. | 315/291 |
| 6,456,012 | B1 | | 9/2002 | Kuroda | |
| 6,633,301 | B1 | * | 10/2003 | Dallas et al. | 345/597 |
| 6,673,250 | B2 | * | 1/2004 | Kuennen et al. | 210/748 |
| 2001/0005172 | A1 | * | 6/2001 | Miyashita et al. | 340/641 |

FOREIGN PATENT DOCUMENTS

| | | | |
|---|---|---|---|
| EP | 0 759 686 | A2 | 2/1997 |
| EP | 0 947 883 | A2 | 10/1999 |
| EP | 0 947 883 | A3 | 3/2001 |
| JP | 2000-112024 | A | 4/2000 |
| JP | 2000-267061 | A | 9/2000 |
| JP | 2001-066698 | A | 3/2001 |
| JP | 2002-10177 | A | 1/2002 |

* cited by examiner

*Primary Examiner*—Christopher Mahoney
(74) *Attorney, Agent, or Firm*—Sughrue Mion, PLLC

(57) ABSTRACT

This invention provides a projector capable of correctly informing a user of replacement time of a lamp and significantly improving performance and operation reliability.

A storage circuit is mounted in a detachable lamp unit for accommodating a lamp, and information on the lamp and so on are stored in the storage circuit. If the switch of a projector proper is turned on, a main circuit reads lamp operating time up to the last time from the storage circuit, and compares the read operating time to replacement time of the lamp stored in advance so that the light is emitted from the lamp if the operating time is less, and display for prompting the lamp replacement is performed if the operating time is more, and the light is emitted from the lamp thereafter. If the switch of the projector proper is turned off, the main circuit adds the operating time of this time to the operating time of the lamp up to the last time read from the storage circuit on turning on the switch and writes it to the storage circuit.

21 Claims, 6 Drawing Sheets

PROJECTOR AND LAMP INFORMATION MANAGEMENT METHOD USED FOR THE SAME

BACKGROUND OF THE INVENTION

1. Field of the Invention

The present invention relates to a projector and a lamp information management method used for it, and in particular, to a light source and its surrounding structure.

2. Description of the Related Art

As for projectors, there are transmissive and reflective liquid crystal projectors utilizing LCD (Liquid Crystal Display) devices, DLP (Digital Light Processing) projectors utilizing DMD (Digital Micromirror Device) devices and so on.

FIG. 6 shows a configuration example of the projector. In FIG. 6, the power supplied from a power supply 4 to the projector proper is supplied to a ballast circuit 6 for emitting light from a lamp 1 and a main circuit 11 for creating a picture signal and so on via a power supply circuit 5. The ballast circuit 6 is connected to the lamp 1 in a detachable lamp unit 8 via an electrical connector 7 so as to emit the light from the lamp 1.

A picture signal 101 is inputted to the main circuit 11 from the outside, and an image is created by driving a liquid crystal panel (not shown) in an optical engine 2 based on the created picture signal so as to enlarge it with a projection lens 3 and project it onto a screen (not shown).

Such a projector has a fault that the brightness of the lamp 1 is reduced and a projected image becomes darker as operating time becomes longer. For this reason, it is necessary to replace the lamp 1 with a new one after adequate operating time.

Conventionally, a method of informing a user of replacement time of the lamp 1 is to count the operating time with a timer built into the projector proper and emit the light from a lamp replacement indicator lamp provided to the projector proper when exceeding the time stored on the projector proper so as to prompt the replacement.

As for the above-mentioned lamp replacement method, however, it is necessary to reset a timer of the projector proper when the user replaces the lamp earlier than predetermined lamp replacement time. And so there is a problem that, in the case where the reset operation is neglected, the projector proper adds the operating time of the replaced lamp to the operating time so far, and consequently prompts the lamp replacement even though the operating time of the replaced lamp is remaining.

In order to avoid it, it is thinkable to use a method of installing a sensor for detecting a set state of the lamp and having the timer automatically reset by the projector proper when the lamp is replaced. However, there is a problem that, if the user removes the lamp from the projector proper for the sake of checking the lamp, the projector proper detects it as a replacement by a new lamp.

In addition, in the case where the user is appropriately using a plurality of lamps in order to obtain desired brightness, it is not possible to count the operating time for each lamp. Furthermore, there is a problem that, as each individual lamp may be subtly different in light emission characteristics, the brightness and coloration may vary depending on the lamp to be set.

Hence, an example of means for informing a user of replacement time of the lump has been disclosed in a Japanese Patent Laid-Open No.2000-267061 (hereafter referred to as a document 1).

The technique disclosed in the document 1 is that a lamp and a memory are provided in the lamp unit. The operating time of the lamp is stored in the memory. The contents of the memory, that is, the operating time of the lamp are displayed on the counter provided in the lamp unit. Then, a user can recognize the operating time of the lamp by looking at the counter.

On the contrary, in the present invention, though the memory in which the operating time of the lamp is stored in the lamp unit as the document 1, a projector proper itself performs controlling of the emitting light from the lamp or the prompting lamp replacement according to the display of the counter. Then, the technique disclosed in the document 1 is quite different from the present invention.

In addition, other documents similar to the document 1 have been disclosed in a Japanese Patent Laid-Open No.2002-010177 and No.2000-112024.

Thus, an object of the present invention is to provide the projector capable of solving the above problems and correctly informing the user of the replacement time of the lamp to significantly improve performance and operation reliability and lamp information management method used for it.

SUMMARY OF THE INVENTION

The projector according to the present invention has an optical engine for generating an image with optical means utilizing light of a light source and an electronic device driven by an electrical signal and a projection lens for enlarging and projecting a generated image thereof, wherein a unit construction having the above described light source mounted therein and removable from a projector proper and storage means placed in the above described unit construction for storing electrical information are provided.

The lamp information management method according to the present invention is that of the projector having the optical engine for generating the image with optical means utilizing the light of the light source and the electronic device driven by the electrical signal and the projection lens for enlarging and projecting the generated image thereof, wherein the storage means for storing the electrical information on the above described lamp is placed in the unit construction having the above described light source mounted therein and removable from the projector proper.

To be more specific, the projector according to the present invention has the optical engine for generating the image with the optical means utilizing the light of the light source and the electronic device driven by the electrical signal and the projection lens for enlarging and projecting the generated image thereof, and is equipped with the unit construction having the light source mounted therein and removable from the projector proper and the storage means placed in the unit construction for electrically storing information.

The projector according to the present invention has operating time of the lamp, a type or a serial number, light emission characteristics of the lamp or color correction information on a projected image and so on stored by the storage means.

Thus, as for the projector according to the present invention, the unit construction for accommodating the light source is removable from the projector proper, and the storage means for storing the electrical information is provided in the unit construction capable of lamp replacement from the projector proper so as to have the operating time of the lamp stored.

As this storage means is provided in the unit construction, there is always a one-to-one relationship between the stored information and the lamp even if the lamp is replaced. Accordingly, even if the lamp is removed from the projector proper and is set again thereafter, the projector proper can read the operating time of the set lamp so that it can always inform the user of appropriate replacement time for the set lamp.

To be more specific, it is possible, just by setting the lamp on the projector proper, to inform the user of the appropriate replacement time of the lamp even in the case where the lamp is removed from the set before reaching the replacement time or a plurality of replacement lamps are appropriately used.

As for the projector according to the present invention, the contents to be stored by the storage means are a type or a serial number of the lamp so that, even in the case where the lamp of another model is mistakenly set on the projector proper, the projector proper can read the type or a serial number of the lamp before light emitting operation of the lamp. Therefore, it is possible to avoid the light emitting operation of the lamp.

It is possible, by this action, to significantly improve reliability of the lamp. And it is also possible, while the connector form and/or lamp unit structure were/was changed for each model in the past, to standardize the structures.

Furthermore, as for the projector according to the present invention, the contents to be stored by the storage means are the light emission characteristics of the lamp so that, even in the case where there are individual differences in the light emission characteristics of the lamp or in the case of a subsequently developed lamp, the projector proper can read the light emission characteristics of the lamp. Therefore, it is possible to control brightness and coloration of the projected image according to the characteristics of each individual lamp.

DETAILED DESCRIPTION OF THE PREFERRED EMBODIMENTS

Figure 1:
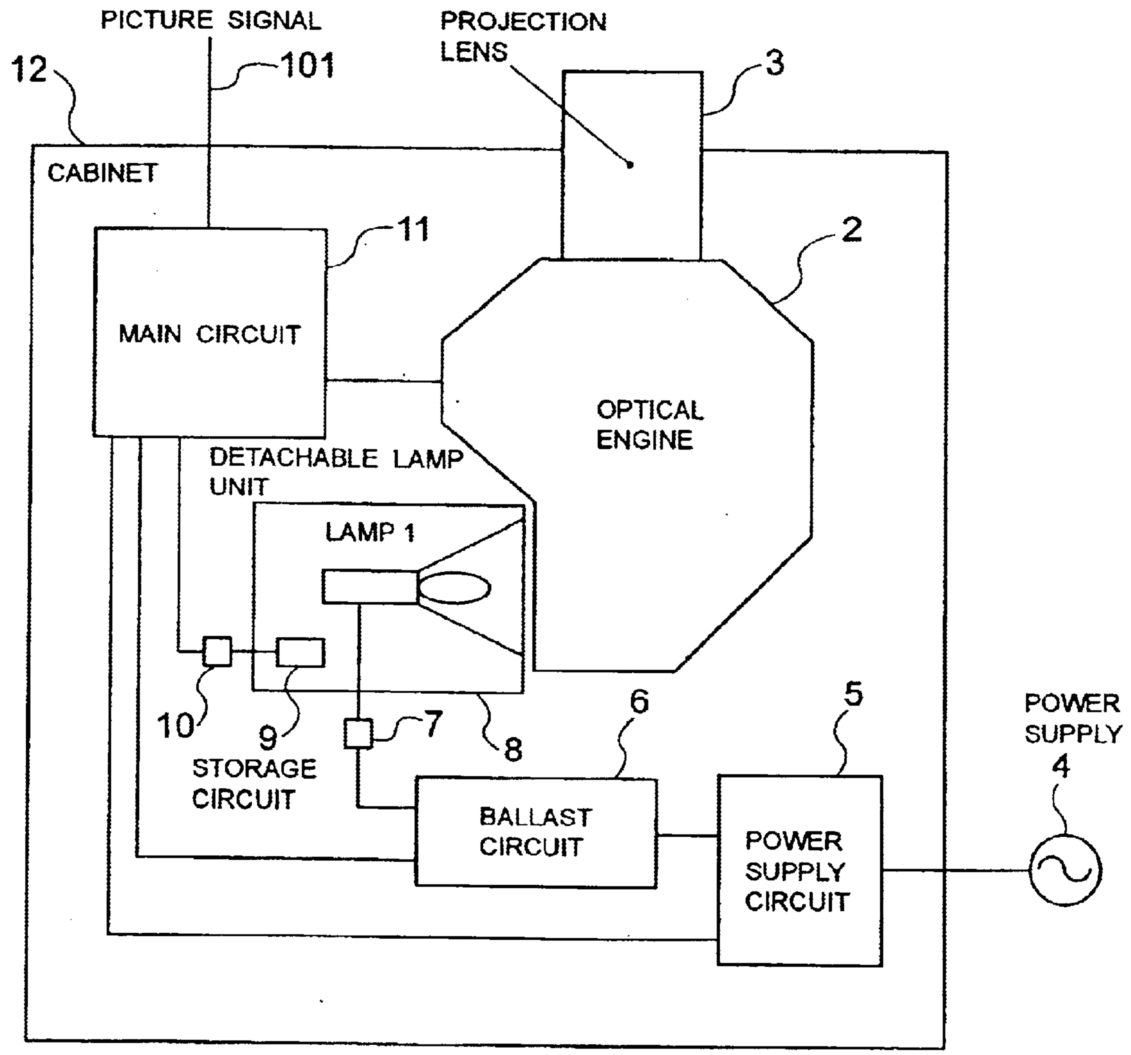
FIG. 1 is a block diagram showing a configuration of a projector according to an embodiment of the present invention.

Next, embodiments of the present invention will be described by referring to the drawings. FIG. 1 is a block diagram showing a configuration of a projector according to an embodiment of the present invention. In FIG. 1, the projector according to an embodiment of the present invention is constituted by accommodating in a cabinet 12 a lamp 1, an optical engine 2, a projection lens 3, a power supply 4, a power supply circuit 5, a ballast circuit 6, electrical connectors 7, 10, a detachable lamp unit 8, a storage circuit 9 and a main circuit 11.

The projector according to an embodiment of the present invention is applicable without being restricted by a method of the optical engine 2 such as transmissive and reflective liquid crystal projectors utilizing LCD (Liquid Crystal Display) devices and DLP (Digital Light Processing) projectors utilizing DMD (Digital Micromirror Device) devices.

The power supplied from the power supply 4 to the projector proper is supplied to the ballast circuit 6 for emitting light from the lamp 1 and the main circuit 11 for creating a picture signal and so on via the power supply circuit 5 respectively. The ballast circuit 6 is connected to the lamp 1 via the electrical connector 7 so as to emit the light from the lamp 1.

The detachable lamp unit 8 accommodates the lamp 1 and is constituted to be detachable from the cabinet 12. The storage circuit 9 is placed in the detachable lamp unit 8, and is connected to the main circuit 11 via the electrical connector 10. While the electrical connectors 7, 10 are the parts for removing the detachable lamp unit 8 from the cabinet 12, it may also have a contact type structure.

A picture signal 101 is inputted to the main circuit 11 from the outside, and an image is created by driving a liquid crystal panel (not shown) in the optical engine 2 based on the created picture signal so as to enlarge it with the projection lens 3 and project it onto a screen (not shown).

Figure 2:
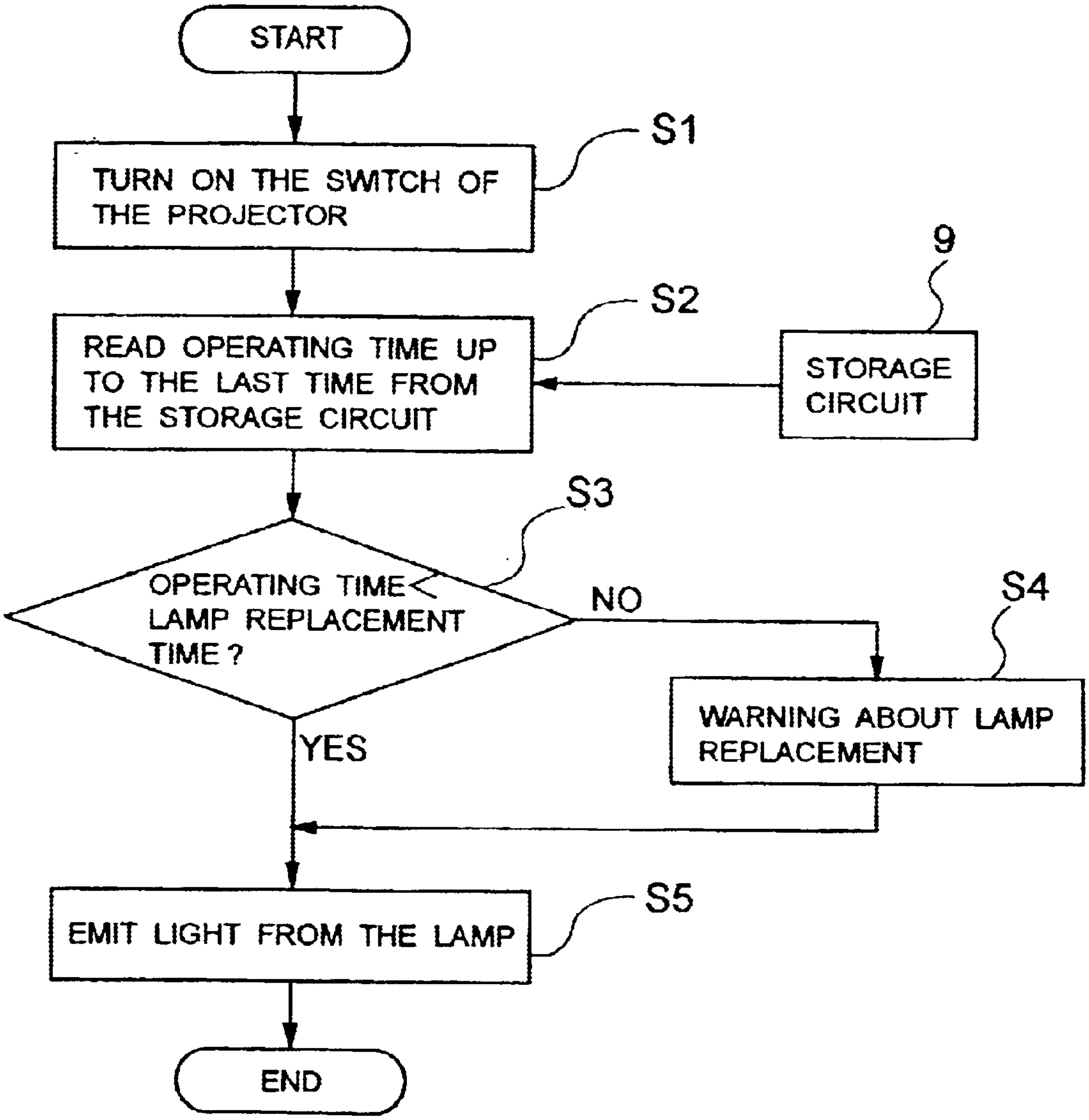
FIG. 2 is a flowchart showing operation on turning on a switch of the projector according to an embodiment of the present invention.
Figure 3:
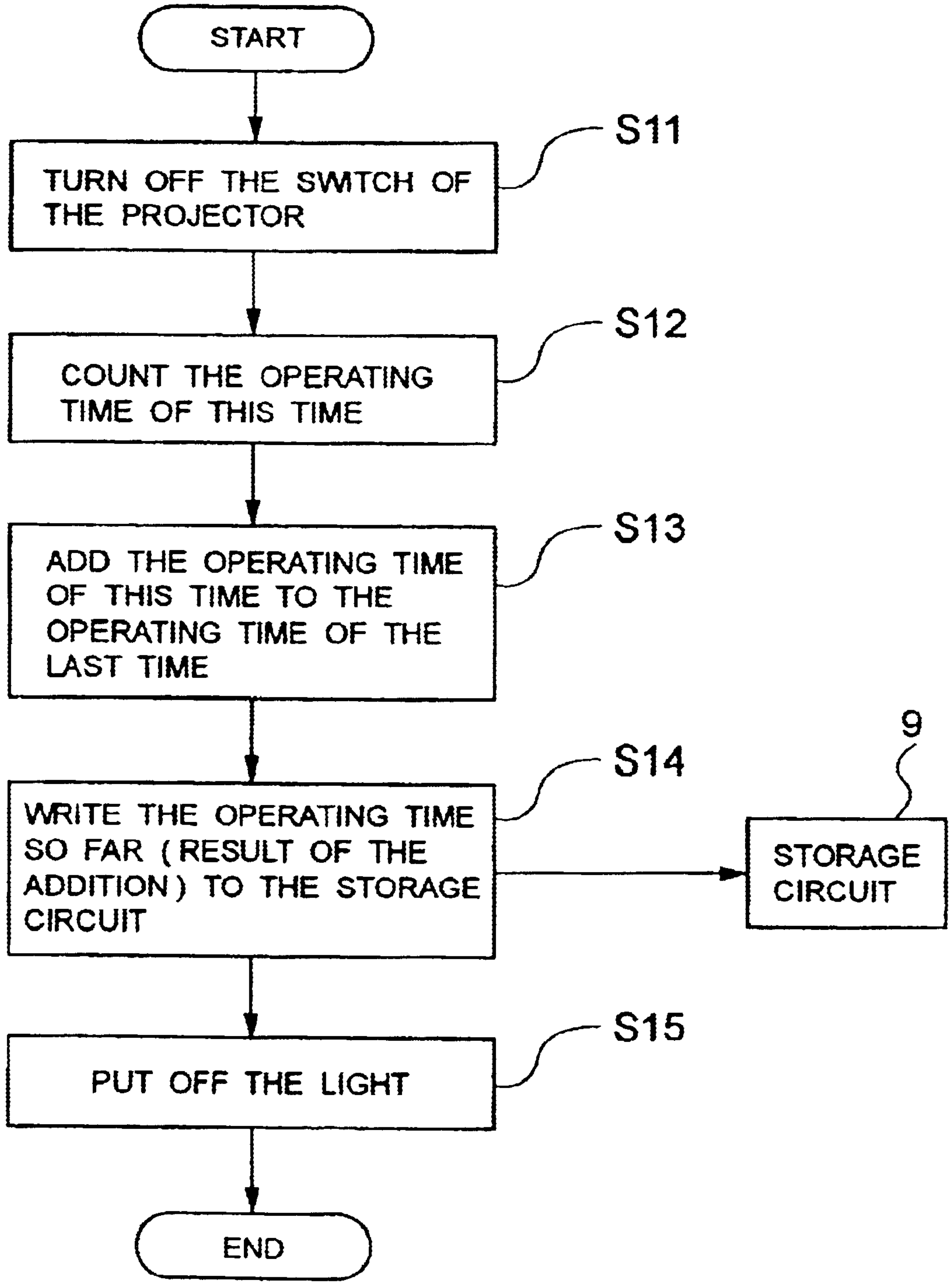
FIG. 3 is a flowchart showing the operation on turning off the switch of the projector according to an embodiment of the present invention.

FIG. 2 is a flowchart showing operation on turning on a switch of the projector according to an embodiment of the present invention, and FIG. 3 is a flowchart showing the operation on turning off the switch of the projector. The operation of the projector according to an embodiment of the present invention will be described by referring to FIGS. 1 to 3.

If the switch (not shown) of the projector is turned on (step S1 in FIG. 2), the main circuit 11 reads lamp operating time up to the last time from the storage circuit 9 mounted in the detachable lamp unit 8 (step S2 in FIG. 2).

The operating time read from the storage circuit 9 is compared to replacement time of the lamp 1 stored in the main circuit 11 in advance (step S3 in FIG. 2). If the operating time is less than the lamp replacement time, the light is emitted from the lamp 1 (Step S5 in FIG. 2). As opposed to this, if the operating time is equal to or more than the lamp replacement time, display for prompting the lamp replacement is performed (Step S4 in FIG. 2) and the light is emitted from the lamp 1 thereafter (Step S5 in FIG. 2).

If the switch of the projector is turned off (step S11 in FIG. 3), the main circuit 11 counts the operating time of this time (step S12 in FIG. 3), and adds the operating time of this time to the operating time of the lamp 1 up to the last time read from the storage circuit 9 on turning on the switch and writes it to the storage circuit 9 (step S13, S14 in FIG. 3) so as to put off the light of the lamp 1 (step S15 in FIG. 3).

In this case; it is also possible, in the case where the operating time of the lamp 1 reaches or exceeds the lamp replacement time during use of the projector proper, to have display of the lamp replacement cut into the projected image and thereby inform a user or emit the light from an LED (Light Emitting Diode) for display of the lamp replacement provided to the projector proper. As for information to be stored in the storage circuit 9, it is possible to store the number of times of putting on and off the lamp 1, time at which it was put on and duration of lighting in addition to the operating time of the lamp 1.

Figure 4:
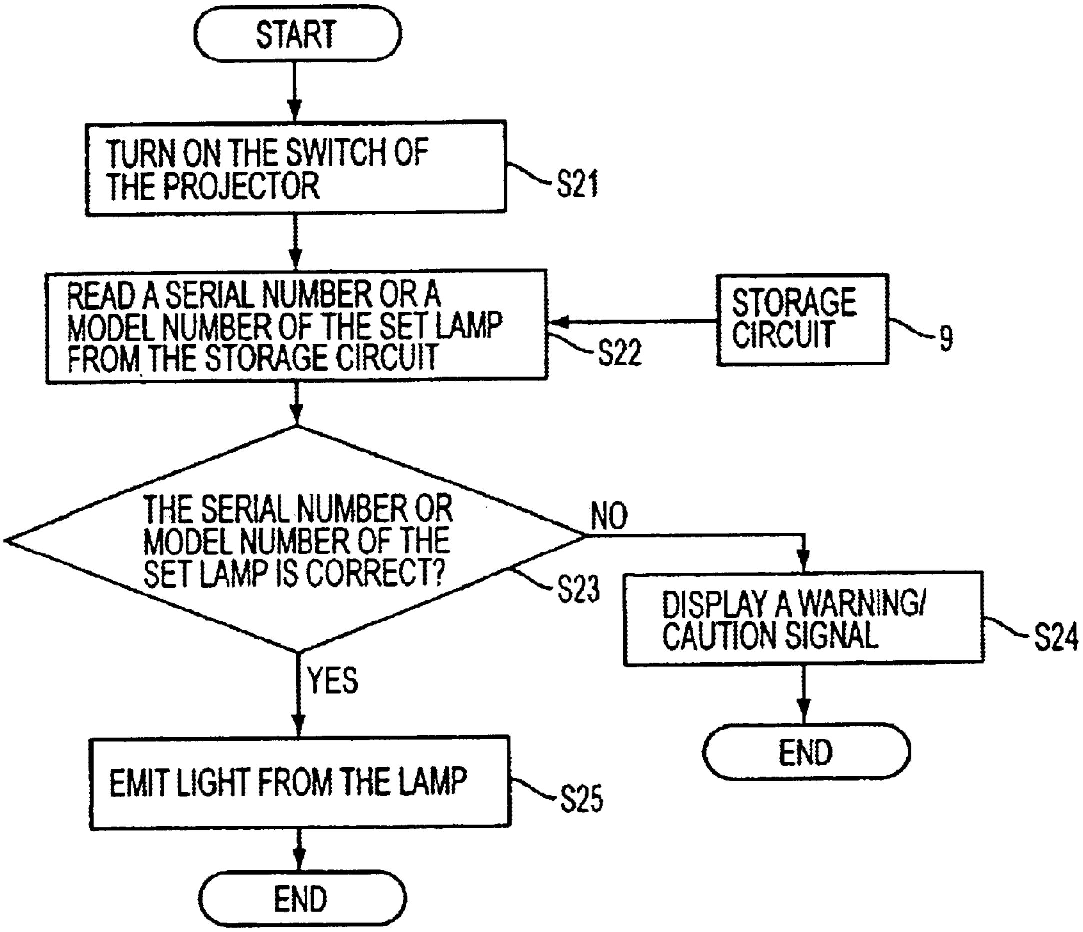
FIG. 4 is a flowchart showing the operation on turning on the switch of the projector according to another embodiment of the present invention.

FIG. 4 is a flowchart showing the operation on turning on the switch of the projector according to another embodiment of the present invention. The projector has the same configuration as the projector according to an embodiment of the present invention shown in FIG. 1 except that contents of storage of the storage circuit 9 and the operation of the main circuit 11 are different.

According to the other embodiment of the present invention, a type or a model number of the lamp 1 is stored in the storage circuit 9. The operation of the projector according to the other embodiment of the present invention will be described by referring to FIGS. 1 and 4.

If the switch of the projector is turned on (step S21 in FIG. 4), the main circuit 11 reads the model number of the lamp 1 from the storage circuit 9 mounted in the detachable lamp unit 8 (step S22 in FIG. 4).

The model number of the lamp 1 read from the storage circuit 9 is compared to check whether it is an adequate model number stored in the main circuit 11 in advance (step S23 in FIG. 4), and if it is an adequate lamp 1, the light is emitted therefrom (step S25 in FIG. 4). If it is an incorrect lamp 1, display for prompting warning and/or caution is performed (step S24 in FIG. 4) and no light is emitted from the lamp 1.

Figure 5:
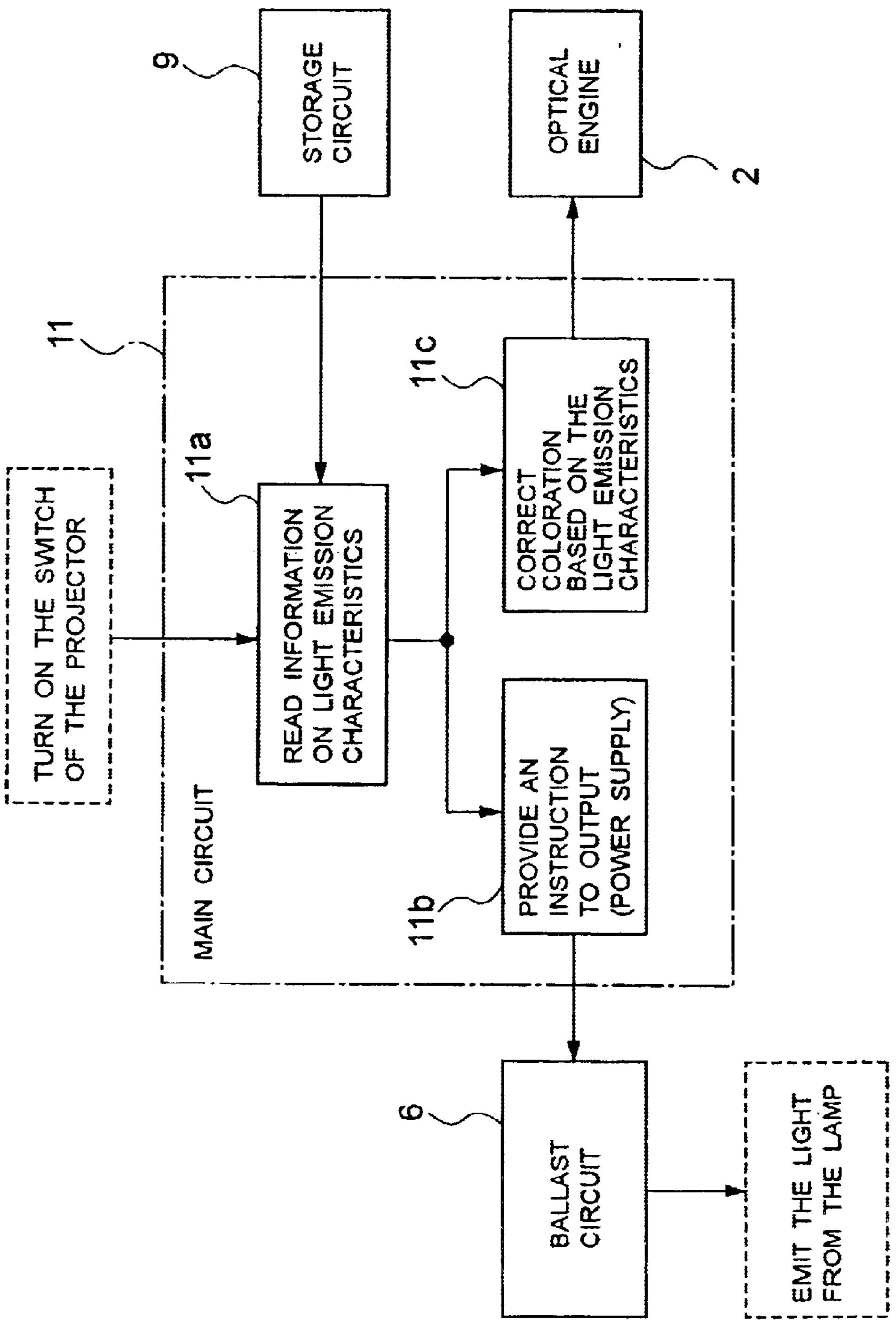
FIG. 5 is a diagram showing the operation of a main circuit according to the other embodiment of the present invention.
Figure 6:
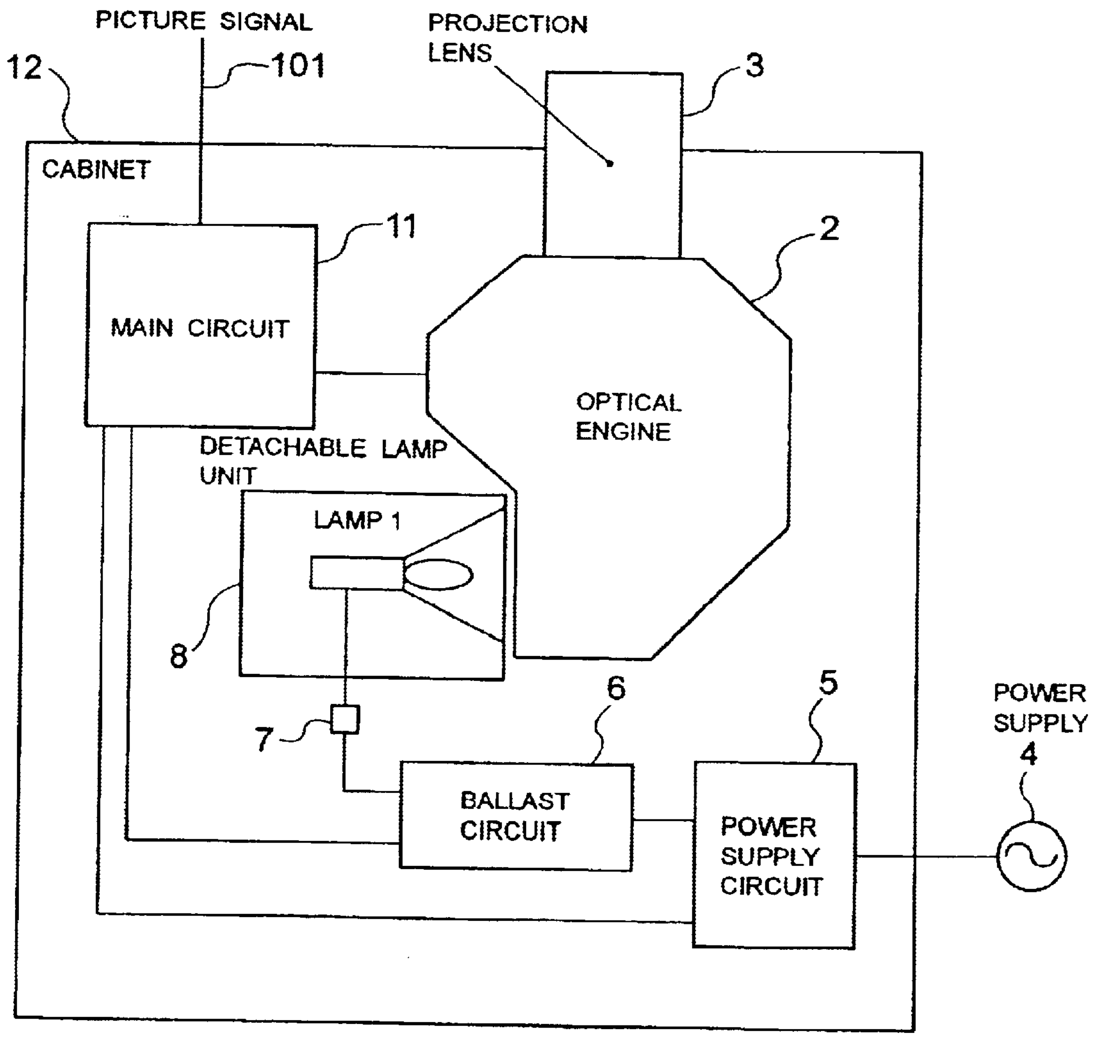
FIG. 6 is a block diagram showing the configuration of the projector in the past.

FIG. 5 is a diagram showing the operation of the main circuit 11 according to another embodiment of the present invention. The projector according to the other embodiment of the present invention has the same configuration as the projector according to an embodiment of the present invention shown in FIG. 1 except that the contents of storage of the storage circuit 9 and the operation of the main circuit 11 are different.

According to the other embodiment of the present invention, light emission characteristics of the lamp 1 are stored in the storage circuit 9. The operation of the projector according to the other embodiment of the present invention will be described by referring to FIGS. 1 and 5.

If the switch of the projector is turned on, the main circuit 11 reads the light emission characteristics of the lamp 1 from the storage circuit 9 mounted in the detachable lamp unit 8 (see 11*a* in FIG. 5).

The main circuit 11 corrects coloration of the projected image based on the light emission characteristics read from the storage circuit 9 (see 11*c* in FIG. 5). This correction of coloration curbs variations in color due to individual differences in the lamp 1 and allows the lamp 1, even if subsequently developed, to have its light emission characteristics stored so that optimum coloration can be constantly implemented.

The light emission characteristics of the lamp 1 referred to here are a relationship between a wavelength and brightness of a visible light area, which is an important characteristic for significantly changing the coloration of the projector. At the same time, it is possible, if the operating time of the lamp 1 is stored together, to estimate reduction in the brightness against the operating time so that the main circuit 11 can provide an instruction to increase lamp power to the ballast circuit 6 according to deficiency of the brightness (see 11*b* in FIG. 5).

Thus, according to the present invention, it is also possible, for the sake of allowing the lamp replacement from the cabinet 12, to accommodate the lamp 1 into the detachable lamp unit 8 which is detachable from the cabinet 12 and provide the storage circuit 9 in the detachable lamp unit 8 so as to have the operating time of the lamp 1 stored in the storage circuit 9.

As the storage circuit 9 is provided in the detachable lamp unit 8, it is also possible, even if the lamp is replaced, to constantly keep the stored information, that is, the operating time of the lamp 1 and the lamp 1 in a one-to-one relationship. Accordingly, it is feasible, even if the lamp 1 is removed from the cabinet 12 and then is set again, to have the operating time of the lamp 1 in the set detachable lamp unit 8 read by the main circuit 11 from the storage circuit 9 so as to constantly inform the user of appropriate replacement time of the lamp 1.

To be more specific, it is feasible, just by setting the detachable lamp unit 8 in the cabinet 12, to inform the user of the appropriate replacement time of the lamp 1 even in the case where the lamp 1 is removed from the set before reaching the replacement time or a plurality of replacement lamps are appropriately used.

Moreover, the storage circuit 9 can store the type or serial number of the lamp 1, light emission characteristics of the lamp 1 or color correction information on the projected image and so on in addition to the operating time of the lamp 1, and performs the operation described above corresponding to such information irrespective of whether such information is single or combined.

As described above, according to the present invention, the projector has the optical engine for generating the image with the optical means utilizing the light of the light source and the electronic device driven by the electrical signal and the projection lens for enlarging and projecting the generated image thereof, where the storage means for storing the electrical information on the lamp is provided in the unit construction having the light source mounted therein and removable from the projector proper so as to correctly inform the user of the replacement time of the lamp and obtain the effects of significantly improving the performance and operation reliability.

What is claimed is:

1. A projector comprising:

an optical engine for generating an image utilizing light of a lamp and an electronic device driven by an electrical signal; and a projection lens for enlarging and projecting the generated image, a unit having said lamp mounted therein; and storage in said unit for storing a serial number of said lamp.

2. The projector according to claim 1, wherein said storage further stores a type of said lamp.

3. The projector according to claim 1, wherein said storage further stores an operating time of said lamp.

4. The projector according to claim 1, wherein said storage further stores light emission characteristics of said lamp.

5. A lamp information management method of a projector having an optical engine for generating an image utilizing light of a lamp and an electronic device driven by an electrical signal; and a projection lens for enlarging and projecting a generated image, said method comprising:

placing a storage in a unit having said lamp mounted therein; and storing a serial number of said lamp in said storage.

6. The lamp information management method according to claim 5, wherein said storage further stores a type of said lamp.

7. The lamp information management method according to claim 6, further comprising:

reading the type of said lamp from said storage circuit;

comparing the read type of said lamp to a preset type of said lamp;

if the lamp is in compliance as a result of the comparison, emitting light from said lamp; and if the lamp is not in compliance as a result of the comparison, performing a display for prompting warning and/or caution and emitting no light from said lamp.

8. The lamp information management method according to claim 5, wherein said storage further stores an operating time of said lamp.

9. The lamp information management method according to claim 8, further comprising:

reading an operating time of said lamp from said storage;

comparing the read time to a preset replacement time of said lamp;

if the operating time of said lamp is less than the replacement time of said lamp, emitting light from said lamp;

if the operating time of said lamp is equal to or more than the replacement time of said lamp, performing display for prompting lamp replacement; and after performing the display, emitting the light from said lamp.

10. The lamp information management method according to claim 5, further comprising:

reading the serial number of said lamp from said storage;

comparing the serial number of said lamp to a preset serial number;

if the lamp is in compliance as a result of the comparison, emitting the light from said lamp; and if the lamp is not in compliance as a result of the comparison, performing display for prompting warning and/or caution and emitting no light from said lamp.

11. The lamp information management method according to claim 5, wherein said storage further stores light emission characteristics of said lamp.

12. The lamp information management method according to claim 11, further comprising:

reading light emission characteristics of said lamp from said storage; and correcting coloration of a projected image based on the read light emission characteristics.

13. The lamp information management method according to claim 11, further comprising:

reading light emission characteristics of said lamp from said storage; and providing an instruction to increase power of said lamp based on brightness information included in the read light emission characteristics.

14. A projector, comprising:

a detachable lamp unit, said lamp unit comprising:

a lamp; and a storage circuit storing the elapsed usage time of said lamp, emission characteristics of said lamp, and the serial number of said lamp; and an optical engine for projecting an image with light from said lamp.

15. The projector according to claim 14, further comprising:

adjustment means for adjusting the image projected by said optical engine based on emission characteristics of said lamp read from said storage circuit.

16. The projector according to claim 14, further comprising:

notifying means for prompting a warning if the elapsed usage time of said lamp read from said storage circuit is longer than a predetermined time.

17. The projector according to claim 14, further comprising:

notifying means for prompting a warning if the serial number of said lamp read from said storage circuit is not the same as at least one predetermined serial number.

18. A method of projecting an image, comprising:

providing a projector, comprising:

a lamp unit and an optical engine, wherein said lamp unit comprises a lamp and a storage circuit; and storing the elapsed usage time of said lamp, emission characteristics of said lamp, and the serial number of said lamp in said storage circuit.

19. The method according to claim 18, further comprising:

reading the elapsed usage time of said lamp from said storage circuit;

comparing the elapsed usage time of said lamp to a preset time;

if the elapsed usage time of said lamp is shorter than said preset time, illuminating said lamp; and if the elapsed usage time of said lamp is longer than or equal to said preset time, prompting a warning.

20. The method according to claim 18, further comprising:

providing an optical engine for projecting an image with light emitted from said lamp;

reading the emission characteristics of said lamp from said storage circuit; and adjusting the image projected by said optical engine based on said emission characteristics.

21. The method according to claim 18, further comprising:

reading the serial number of said lamp from said storage circuit;

comparing the serial number of said lamp to at least one predetermined serial number;

if the serial number of said lamp is the same as at least one of said predetermined serial numbers, illuminating said lamp;

if the serial number of said lamp is not the same as at least one of said predetermined serial numbers, prompting a warning.

* * * * *